United States Patent
Wang et al.

(10) Patent No.: US 11,745,162 B2
(45) Date of Patent: Sep. 5, 2023

(54) REGENERABLE HYDROGEN SULFIDE ADSORBENT AND PREPARATION METHOD THEREOF AND APPLICATION THEREOF

(71) Applicants: SHANGHAI LVQIANG NEW MATERIALS CO., LTD, Shanghai (CN); SHANGHAI RESEARCH INSTITUTE OF CHEMICAL INDUSTRY CO., LTD, Shanghai (CN)

(72) Inventors: Pengfei Wang, Shanghai (CN); Chuncheng Li, Shanghai (CN); Qiuping He, Shanghai (CN); Jia Zhang, Shanghai (CN); Yongxian Zhou, Shanghai (CN); Cheng Chen, Shanghai (CN); Wei Chen, Shanghai (CN)

(73) Assignees: SHANGHAI LVQIANG NEW MATERIALS CO., LTD, Shanghai (CN); SHANGHAI RESEARCH INSTITUTE OF CHEMICAL INDUSTRY CO., LTD, Shanghai (CN)

( * ) Notice: Subject to any disclaimer, the term of this patent is extended or adjusted under 35 U.S.C. 154(b) by 0 days.

(21) Appl. No.: 17/535,700

(22) Filed: Nov. 26, 2021

(65) Prior Publication Data

US 2022/0168703 A1 Jun. 2, 2022

(30) Foreign Application Priority Data

Nov. 29, 2020 (CN) .......................... 202011367227.1

(51) Int. Cl.
*B01J 20/08* (2006.01)
*B01D 53/04* (2006.01)
(Continued)

(52) U.S. Cl.
CPC .............. *B01J 20/08* (2013.01); *B01D 15/08* (2013.01); *B01D 53/04* (2013.01);
(Continued)

(58) Field of Classification Search
None
See application file for complete search history.

(56) References Cited

U.S. PATENT DOCUMENTS 3,148,157 A * 9/1964 Pollitzer .................. B01J 23/04
502/200
3,154,595 A * 10/1964 Corey ...................... B01J 21/02
502/200

(Continued)

FOREIGN PATENT DOCUMENTS

| CN | 1037942 | 4/1998 |
|----|---------|--------|
| CN | 101485954 | 12/2011 |

(Continued)

*Primary Examiner* — Tam M Nguyen
(74) *Attorney, Agent, or Firm* — JCIP GLOBAL INC.

(57) ABSTRACT

The present invention relates to a regenerable hydrogen sulfide adsorbent and a preparation method thereof. The preparation method specifically includes: 1) combining meta-aluminate as an active component with activated alumina as a carrier in a manner of impregnation, spray coating or solid phase mixing to obtain a precursor; 2) aging and drying the precursor, and finally performing roasting to obtain the adsorbent; and 3) processing the adsorbent to present a specific size and shape through shaping measures to meet industrial application requirements. Compared with the prior art, the adsorbent obtained according to the present invention can achieve an efficient removal effect on hydrogen sulfide gas at a material inlet, with a concentration adaption range of 0 to 1000 ppm and an effective removal precision of 0.1 ppm or below.

5 Claims, 1 Drawing Sheet

(51) Int. Cl.
 B01D 15/08 (2006.01)
 B01J 20/30 (2006.01)
 B01J 20/32 (2006.01)
 C10G 25/00 (2006.01)
 C10G 33/00 (2006.01)
 C10L 3/10 (2006.01)

(52) U.S. Cl.
 CPC ....... B01J 20/3078 (2013.01); B01J 20/3204 (2013.01); B01J 20/3236 (2013.01); C10G 25/003 (2013.01); C10G 33/00 (2013.01); C10L 3/103 (2013.01); C10L 3/106 (2013.01); B01D 2253/112 (2013.01); B01D 2256/24 (2013.01); B01D 2257/304 (2013.01); B01D 2257/80 (2013.01); B01J 2220/42 (2013.01); C10G 2300/207 (2013.01); C10L 2290/542 (2013.01)

(56) References Cited

U.S. PATENT DOCUMENTS

| | | | | |
|---|---|---|---|---|
| 3,163,612 | A * | 12/1964 | Meisinger | B01J 23/04 502/200 |
| 3,223,483 | A * | 12/1965 | Osment | C01F 7/46 502/355 |
| 3,951,782 | A * | 4/1976 | Buss | C10G 49/06 208/139 |
| 4,217,240 | A * | 8/1980 | Bergna | C01B 33/26 423/328.1 |
| 4,257,874 | A * | 3/1981 | Bergna | C10G 11/05 208/111.1 |
| 4,639,259 | A * | 1/1987 | Pearson | B01D 53/68 252/189 |
| 7,758,837 | B2 | 7/2010 | Kanazirev | |
| 2006/0247480 | A1* | 11/2006 | Jan | C10G 29/205 585/467 |
| 2010/0056837 | A1* | 3/2010 | Jan | C10G 29/205 585/481 |

FOREIGN PATENT DOCUMENTS

| | | |
|---|---|---|
| CN | 101691512 | 4/2012 |
| CN | 108554368 | 9/2018 |

* cited by examiner

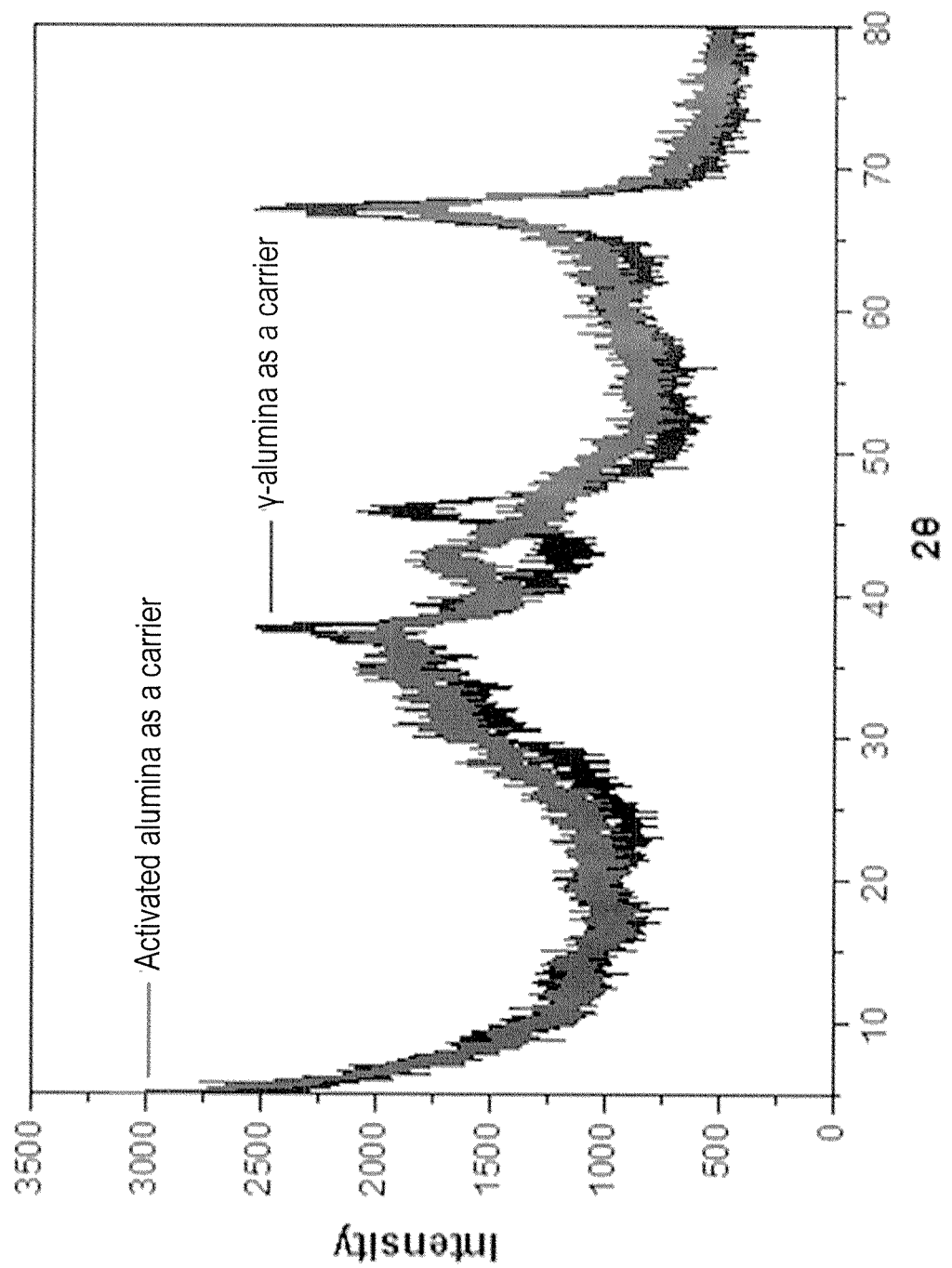

REGENERABLE HYDROGEN SULFIDE ADSORBENT AND PREPARATION METHOD THEREOF AND APPLICATION THEREOF

CROSS-REFERENCE TO RELATED APPLICATION

The present application is based on and claims the priority benefits of China application No. 202011367227.1, filed on Nov. 29, 2020. The entirety of the above-mentioned patent application is hereby incorporated by reference herein and made a part of this specification.

BACKGROUND

Technical Field

The present invention belongs to the technical field of adsorbent preparation, and relates to a regenerable hydrogen sulfide adsorbent and a preparation method thereof.

Description of Related Art

An acidic gas impurity is one of the most widely existing impurities in an industrial production process. Hydrogen sulfide is a common one of this kind of acidic impurity. A certain number of impurities, such as water vapor and hydrogen sulfide are associated in the natural gas exploitation process. For example, in the petroleum refining industry, in order to improve the activity of the catalyst or deactivate a reactor, it often needs to inject a certain quantity of organic sulfides which decompose into hydrogen sulfide under the high temperature conditions to enter the downstream along with the effluent. Although the sulfur injection quantity is not great and the concentration of hydrogen sulfide entering the downstream is not high, the corrosion is caused on downstream equipment, and great harm is caused on the purity of raw materials. Especially, for example, in processes of olefin preparation through dehydrogenation of alkanes, trace amounts of hydrogen sulfide will influence the purity of olefin products, causing poisoning of the polyolefin catalyst.

A fixed bed adsorption method for removing trace hydrogen sulfide from gas or liquid materials has been widely applied to chemical devices. For example, a zinc oxide desulfurizer using an active metal oxide as an effective desulfurizing component is used. CN101485954B discloses a zinc oxide desulfurizer consisting of 40 to 90% of zinc oxide, 5 to 50% of copper oxide and 0 to 20% of a binding agent, which can be used to remove hydrogen sulfide under the condition of normal temperature and has high removal precision.

As a new material for separation and purification, molecular sieve is widely used in industries such as petrochemical industry, coal chemical industry and air separation. CN101691512B discloses a molecular sieve adsorbent for adsorbing organic sulfides in natural gas. A fixed bed is filled with NaX type zeolite, through which the organic sulfides can be removed to 0.1 ppm. Additionally, after regeneration at a temperature of 150 to 200° C., the adsorption activity can be recovered.

Through the efforts of those skilled in the art, the fixed bed adsorption desulfurization techniques are more and more perfect, and the removal precision of the adsorbent on sulfides is higher and higher, but certain disadvantages still exist. For example, the use cost of the metal oxide adsorbent is higher, and sulfides are fixed inside the adsorbent in a chemical reaction form between the metal oxide and hydrogen sulfide, so that the adsorbent is generally in a non-regeneration form, and the adsorbent must be replaced regularly according to the design requirements of process conditions. Although molecular sieve adsorbents such as X-type molecular sieves can be regenerated, they are limited by competitive adsorption, and the adsorption capacity cannot be fully utilized, and especially, the water vapor in the materials may greatly interfere with the hydrogen sulfide removal. Additionally, under the condition of existence of unsaturated hydrocarbons, X-type molecular sieves can induce and catalyze the self polymerization of olefins to form "green oil" due to the existence of their own acidic sites. Due to the existence of "green oil", a bed layer will be polluted, resulting in too early failure of the adsorbent, even causing bed layer hardening problems, and influencing the industrial production.

Activated alumina adsorbent is the most widely used adsorbent in petrochemical industry. The activated alumina has higher specific surface and pore volume, can be used as an excellent carrier of the adsorbent, and can inhibit a polymerization phenomenon of olefin materials on the surface of the alumina carrier by a certain modification, so that the regenerable adsorbent with excellent performance can be prepared.

A U.S. Pat. No. 7,758,837B2 discloses a modified alumina type acidic gas adsorbent, natural ore powder is added to alumina powder, the natural ore powder and the alumina powder interact with each other to prepare an adsorbent with low cost and excellent dechlorination performance. A Chinese patent CN1037942C discloses a hydrogen chloride adsorbent and a preparation method thereof, and the hydrogen chloride adsorbent is prepared from γ-alumina powder and alkali metal carbonate or alkaline earth metal carbonate, and can be used to remove hydrogen chloride from gas or liquid hydrocarbon.

In the above patents, alumina disperses alkali metal, and can also adsorb acidic substances by itself. Additionally, alkali metal salts are introduced, so that the acidic impurity removal capability is improved. CN108554368A discloses a preparation method and an application of an adsorbent for removing low-concentration hydrogen sulfide, an alkali metal bicarbonate is impregnated on a pseudo-boehmite carrier to obtain a catalyst precursor, and then the forming is performed to obtain a supported adsorbent. In the patent, a desulfurization range of the adsorbent is 10 to 500 ppm, and the precision is 0.1 ppm.

It can be seen from the prior art that the related patents applied to regenerable adsorbents use molecular sieves as adsorbents, and are applied to organic sulfur removal, while none of the other adsorbents used to remove acidic hydrogen sulfide gas is regenerable. Additionally, the existing desulfurizer is generally unsuitable to be applied to a process requiring frequent regeneration. For example, an RED unit of a propane dehydrogenation unit requires to remove hydrogen sulfide from a medium to a value below 0.1 ppm under condition of containing relatively high water vapor. At present, this technical process adopts a TSA adsorption process, the adsorbent is required to keep good adsorption capability on impurities such as H2S and moisture under the working condition of frequent switching of regeneration without attenuation.

SUMMARY

The objective of the present invention is to provide a regenerable hydrogen sulfide adsorbent and a preparation method thereof. Compared with the prior art, a composite adsorbent prepared by the present invention has the obvious advantages. Firstly, in an aspect of cost control, low-cost materials are used. Secondly, a wider application range of 0 to 1000 ppm on a concentration of hydrogen sulfide in the materials is achieved, and additionally, an outlet precision can be enabled to reach 0.1 ppm or below. Finally, the adsorbent can be repeatedly regenerated and reused, and side reactions are low.

The objective of the present invention can be achieved by the following technical solution.

In one aspect, the present invention provides a regenerable hydrogen sulfide adsorbent consisting of two parts: an active component and a carrier, wherein the active component is meta-aluminate, and the carrier is activated alumina.

Further, a weight ratio of the meta-aluminate is 0.5 to 40%, and a weight ratio of the activated alumina is 60 to 99.5%. Further, the weight ratio of the meta-aluminate is 5 to 25%, and the weight ratio of the activated alumina is 75 to 95%.

Further, the activated alumina is chi-phase alumina, rho-phase alumina, eta-phase alumina, gama-phase alumina or a mixed phase thereof. Generally, the market selectable activated alumina is mainly gama-phase alumina. According to a preferable implementation, the activated alumina of different phases or mixed phases is obtained by using diaspore, gibbsite and the like as raw materials through adjusting a roasting process. For example, the gama-phase activated alumina can be obtained by selecting pseudo-boehmite as a raw material by adjusting a roasting temperature, and the selected temperature is in a range of 400 to 600° C. For the patent of the present invention, more preferably, the activated alumina with chi-rho and eta phases in its crystal phase structures obtained by roasting aluminum hydroxide at a high temperature and performing fast dehydration is used as a raw material. During aging, the activated alumina interacts with water and active components, so that the adsorbent gains better mechanical performance, and can be better combined with the active components to form active adsorption sites. Preferably, a particle size of the activated alumina raw material is 10 to 45 μm.

Further, the meta-aluminate is a metal salt compound of a "$AlO_2^-$" atomic group and a metal element M and/or hydrogen element, and the metal element M is selected from one or a combination of more of alkali metal and/or alkaline earth metal elements.

Further, the metal element M is one or two of Na and K. That is, the meta-aluminate is one or a combination of two of sodium meta-aluminate and potassium meta-aluminate.

Further, in the meta-aluminate, a mole ratio of the metal element M to an aluminum element is (1-5.5):1. More preferably, in the meta-aluminate, the mole ratio of the metal element M to the aluminum element is (1.0-3.5):1. More preferably, a mole ratio of the metal element M to the aluminum element is (1.1-2.0):1.

In another aspect, the present invention further provides a preparation method of the regenerable hydrogen sulfide adsorbent, including: firstly weighing the active component, combining the active component with the carrier to obtain a precursor, and then performing aging, drying and roasting to obtain a target product.

Further, the active component is combined with the carrier in a manner of solution impregnation, spray coating or solid mixing. In a specific preparation process, the meta-aluminate can use a conventional commercially available meta-aluminate solution, can be freshly prepared meta-aluminate, and can be a solid. The meta-aluminate is preferably the freshly prepared meta-aluminate because the aluminate is unstable, precipitates are easily formed after the placement for a too long time, and a proportion ratio of the metal element M to the aluminum element generates an uncontrollable change. As being known by those skilled in the art, during preparation of the meta-aluminate solution, aluminum hydroxide is generally added into an MOH solution by mixing, and the aluminum hydroxide is dissolved under the conditions of stirring and heating. By controlling the addition quantity of the MOH and the aluminum hydroxide, the mole ratio of the M to the aluminum element is adjusted, and a preferable mole ratio of the M to the aluminum element is in a range of 1.1 to 2.0. At this ratio, the obtained meta-aluminate can be placed and stored for a long time. When a mole ratio of M to Al is higher, for example, M:Al=3.5, the solution generally needs to be immediately used after being prepared because precipitates may be started to separate out after the placement for several days. The used aluminum hydroxide is preferably soluble aluminum hydroxide. When solid meta-aluminate is used, a particle range is preferably 5 to 75 μm, and is more preferably 10 to 45 μm.

Further, an aging temperature is 25 to 150° C., and preferably 80 to 130° C., and the aging time is 8 to 48 h, and preferably 12 to 24 h. In an aging process, the precursor can obtain better mechanical performance on one hand, and additionally, the adsorption activity is improved. According to the patent of the present invention, whether the aging may influence the comprehensive performance of the adsorbent or not is compared through experiments, and this is also proved by the obtained conclusion. The aging temperature is preferably 80 to 130° C., and the aging time is preferably 12 to 24 h.

Further, a drying temperature is 60 to 150° C., and preferably 80 to 120° C., and the drying time is 0.5 to 24 h.

Further, a roasting temperature is 300 to 600° C., and preferably 350 to 450° C., and the rotating time is 1 to 5 h, and preferably 2 h.

Further, the mixture can achieve the combination of the active component and the alumina in a manner of impregnation, spray coating or solid phase mixing. In order to meet industrialized application, after a product is prepared and formed in a subsequent process, adsorbent products in shapes such as a spherical shape, a strip shape and a flaky shape may also be obtained through measures, such as rolling forming, extrusion forming, tableting forming and spraying forming familiar by those skilled in the art. The drying temperature is preferably 80 to 120° C. The roasting temperature is preferably 350 to 450° C., and the rotating time is preferably 2.0 h. At the same time, in order to ensure the stability of the adsorbent in the application process, the adsorbent needs to satisfy proper indexes such as a stacking density, a crushing strength and abrasion. According to a feasible implementation parameter, the stacking density is 0.75 g/mL, the crushing strength >15 N/particle, and the abrasion <0.5% wt.

A TSA adsorption process is well-known by those skilled in the art. After reaching adsorption saturation, the adsorbent needs to be regenerated. In industry, this boundary is determined by the value of $H_2S$ in the effluent from outlet, according to the process technical parameter. This kind of process is generally realized through the combined use of 2 or more adsorbent beds. By taking a 2-bed adsorption process as an example, after one adsorption bed reaches adsorption saturation, the adsorption bed is switched to another adsorption bed, and the current adsorption bed enters a regeneration process. Gas used for regeneration may be hydrogen gas, nitrogen gas, synthesis gas and the like. For an industrial device with a by-product of hydrogen gas, such as a reformer and an alkane dehydrogenation device, by using the hydrogen gas as a regeneration medium, better economic performance and higher efficiency are achieved. Generally, during regeneration, a flowing direction of the medium is opposite to a flowing direction of a raw material so as to achieve thorough regeneration. If the effluent passes through the adsorbent bed layer from top to bottom, the regenerant stream through the bed layer from bottom to top during regeneration. A regeneration temperature is preferably 200 to 250° C. During regeneration, the temperature rise of a bed layer should not be too fast, and does not exceed 5° C./min generally.

A regeneration mechanism of the adsorbent still needs to be expressed by a more comprehensive analysis measure, but this does not obstruct the substantive application of the patent of the present invention. A possible deduction may be that the hydrogen sulfide and the meta-aluminate form adsorption force between chemical adsorption and physical adsorption, and this kind of adsorption process is favorable to improving the selective adsorption capability of the adsorbent under the water vapor existing condition. In the regeneration process, after the temperature rises, the adsorption force between the hydrogen sulfide and the meta-aluminate can be damaged, so that the hydrogen sulfide is desorbed from the adsorbent to achieve the goal of regeneration.

BRIEF DESCRIPTION OF THE DRAWINGS

FIGURE is an XRD diagram of using conventional commercially available gama-phase alumina as a carrier and using the activated alumina specially prepared according to the present invention as a carrier sample.

DESCRIPTION OF THE EMBODIMENTS

The present invention will be further illustrated in detail in conjunction with drawings and specific embodiments hereafter. The present embodiment is implemented on the premise of the technical solution of the present invention. Detailed implementations and specific operation processes are given. However, the protection scope of the present invention is not limited to the following embodiments.

In each of the following embodiments, commercially available gama phase-alumina, pseudo-boehmite and activated alumina powder were all purchased from Aluminum Corporation of China, and hydrogen sulfide standard gas was purchased from Shanghai Shenkai gas technology Co., Ltd.

In each of the following embodiments, each of prepared catalyst samples was subjected to desulfurization performance evaluation tests and butadiene side reaction evaluation experiments. The specific data were as follows.

The evaluation conditions were shown in Table 1.

TABLE 1

| Adsorbent evaluation condition | |
|---|---|
| Standard gas composition | 1000 ppm $H_2S$, 50% V propene, and the balance $N_2$ |
| Test pressure | 1.5 MPa |
| Evaluation temperature | 25-30° C. |
| Sample loading volume | 40.00 ± 0.1 g |

TABLE 1-continued

| Adsorbent evaluation condition | |
|---|---|
| Flow rate | 2000 mL/min |
| Regeneration medium | $H_2$ |
| Regeneration condition | 250° C. constant temperature for 1.5 h<br>0.5 MPa<br>Flow rate 500 mL/min |

A specific evaluation method was as follows. Firstly, 40.0 g of fresh adsorbent was added into a fixed bed reactor, nitrogen gas was introduced to purge a system, then, a back pressure valve was adjusted so that a system pressure was stabilized at 1.5 MPa, and then, the operation entered an evaluation step. A gas path was switched to introduce the hydrogen sulfide standard gas into the system, a parameter of a mass flowmeter was set to be 2000 mL/min, and the evaluation was started. Tail gas was introduced into gas chromatography. The tail gas was collected once every 3 min. When the outlet concentration of hydrogen sulfide is higher than 0.1 ppm, the condition was regarded as adsorption saturation, and the operation entered a regeneration step. Firstly, the gas path was switched into hydrogen gas to purge the system for 10 min, a pressure was adjusted to 0.5 MPa, and then, temperature rise was started. The bed layer temperature rise speed was 4° C./min. After the bed layer temperature reached 250° C., the temperature kept constant for 3.5 h, and the regeneration was finished. Then, the system lowers the temperature to a room temperature, the gas path was switched to the hydrogen sulfide standard gas, the flow rate was adjusted, and the second adsorption was started. The adsorption performance was calculated according to the adsorption time. After the adsorption time decreases, the condition showed that the service life of the adsorbent started to attenuate. When the adsorption time was reduced to 75% of the initial adsorption time, it was regarded that the bed layer was inactivated.

Butadiene side reaction evaluation experiment: A sample to be evaluated was charged into a pressure container. Then, a temperature of the pressure container was raised to 200° C. Next, butadiene was introduced. The pressure was about 0.5 atmospheric pressure. The sample was maintained at this pressure for 7 h. The self-polymerization degree of the butadiene was calculated by recording a pressure drop value. In a blank experiment, after 7 h, the pressure drop was about 5%.

The rest raw materials or processing techniques, if not specified, are all conventional commercially available raw materials or conventional processing techniques in the art.

Embodiment 1

In the present embodiment, a desulfurizer was prepared from activated alumina, sodium hydroxide and aluminum hydroxide as raw materials.

Firstly, 4.1 kg of sodium hydroxide was dissolved in 6.2 kg of deionized water. Then, 3.9 kg of aluminum hydroxide was dissolved into a sodium hydroxide solution to be prepared into a clear and transparent sodium meta-aluminate solution. Next, 8.0 kg of deionized water was slowly supplemented. 21.2 kg of activated alumina (with chi-rho and eta phases in crystal phase structures) and the sodium meta-aluminate solution were sufficiently combined in an equivalent-volume impregnation form. Then, aging was performed for 12 h under the condition of 130° C. Next, the treated raw materials were put into a baking oven of 120° C. at a constant temperature for 3 h to be thoroughly dried. Finally, activation was performed for 2 h in a 450° C. muffle furnace, and an adsorbent sample was obtained. The sample was subjected to tabletting and crushing to obtain irregular particles with the particle size being about 2 mm, and was marked as S1. Through the butadiene side reaction test, the pressure drop was about 13.5%.

Embodiment 2

In the present embodiment, a desulfurizer was prepared from activated alumina, potassium hydroxide and aluminum hydroxide as raw materials.

Spherical particles with the particle size being about 2.0 mm were obtained through forming in a rolling granulation manner. Firstly, 2.9 kg of potassium hydroxide was dissolved in 2.0 kg of deionized water. Then, 3.0 kg of aluminum hydroxide was dissolved into a potassium hydroxide solution to be prepared into a clear and transparent potassium meta-aluminate solution. Next, 5.0 kg of deionized water was slowly added to be prepared into a spray coating solution. 20.1 kg of activated alumina powder (with chi-rho and eta phases in crystal phase structures) was weighed. In rolling forming equipment, the potassium meta-aluminate solution was sprayed and coated onto rapid dehydration powder (activated alumina) to obtain spherical particles. The particle size was about 1.6 to 2.5 mm. Then, the obtained particles were subjected to aging for 24 h under the condition of 130° C. Next, the treated raw materials were put into a baking oven of 120° C. at a constant temperature for 3 h to be thoroughly dried. Finally, activation was performed for 2 h in a 350° C. muffle furnace, and an adsorbent sample was obtained, and was marked as S2. Through the butadiene side reaction test, the pressure drop was about 14.1%.

Embodiment 3

In the present embodiment, a desulfurizer was prepared from activated alumina and sodium meta-aluminate solid as raw materials.

Spherical particles with the particle size being about 2.0 mm were obtained through forming in a rolling granulation manner. The specific steps were as follows: The activated alumina powder (with chi-rho and eta phases in crystal phase structures) and the sodium meta-aluminate solid powder were mixed according to a mass ratio of 19:1. 19.0 kg of activated alumina and 1.0 kg of sodium meta-aluminate were weighed and sufficiently mixed. Then, by using a rolling forming method, bonding was performed through glue water, and a solid content of the glue water was 1.0% wt. Spherical particles with the particle size being about 1.6 to 2.4 mm were obtained, and aging was performed at a temperature of 100° C. for 24 h. Next, the particles were dried for 3 h in a baking oven of 120° C., and were then roasted for 2 h under the condition of 400° C. to obtain a sample, and the sample was marked as S3. Through the butadiene side reaction test, the pressure drop was about 13.3%.

Embodiment 4

In the present embodiment, a desulfurizer was prepared from activated alumina and sodium meta-aluminate solid as raw materials.

Spherical particles with the particle size being about 2.0 mm were obtained through forming in a rolling granulation manner. The specific steps were as follows: 30 kg of activated alumina powder (with chi-rho and eta phases in crystal phase structures) and 10 kg of sodium meta-aluminate solid were weighed according to a mass ratio of 3:1. After the activated alumina and the sodium meta-aluminate were sufficiently mixed, spherical particles with the particle size being about 1.6 to 2.4 mm were obtained in a rolling granulation manner. A sample was subjected to aging for 24 h at a temperature of 100° C., was dried at 120° C., and was then roasted for 2 h under the condition of 400° C. to obtain a sample, and the sample was marked as S4. Through the butadiene side reaction test, the pressure drop was about 14.3%.

Embodiment 5

In the present embodiment, pseudo-boehmite and sodium meta-aluminate solid were used as raw materials.

Extrusion forming was adopted to obtain strip-shaped particles with the strip diameter being about 2.0 mm. The specific steps were as follows: After the pseudo-boehmite and the sodium meta-aluminate solid powder were sufficiently mixed, 30 kg of pseudo-boehmite and 10 kg of sodium meta-aluminate solid were weighed according to a mass ratio of 3:1, and then, a strip-shaped sample with the strip diameter being 2.0 mm was obtained in a basic forming manner. The sample was subjected to aging for 24 h at a temperature of 100° C., was dried for 3 h at 120° C., and was then roasted for 2 h under the condition of 450° C. to obtain a gama-alumina loaded sodium meta-aluminate sample, and the sample was marked as S5. Through the butadiene side reaction test, the pressure drop was about 14.3%.

Comparative Example 1

Commercially available gama-alumina with the particle size being 2.0 mm was used as a sample, and was marked as D1. Through the butadiene side reaction test, the pressure drop was about 40.2%.

Comparative Example 2

Sodium meta-aluminate was used as a sample to be subjected to extrusion forming and crushing to obtain irregular particles in the particle size range about 2.0 mm as a sample, and the sample was marked as D2. Through the butadiene side reaction test, the pressure drop was about 13.8%.

Comparative Example 3

Comparative example 3 was similar to Embodiment 4. The differences were that aging treatment was not performed, drying and roasting were directly performed, and a sample was marked as D3. Through the butadiene side reaction test, the pressure drop was about 43.5%.

Comparative Example 4

Comparative example 4 was similar to Embodiment 4. The differences were that the aging conditions were changed into 50° C. and 48 h, and a sample was marked as D4. Through the butadiene side reaction test, the pressure drop was about 14.7%.

Comparative Example 5

In the present embodiment, commercially available gama-alumina particles and a sodium meta-aluminate solution were used as raw materials for preparation.

2.0 kg of gama-alumina particles in a particle size range of 1.6 to 2.0 mm were weighed. Before use, the particles were activated at 250° C. for 2 h, and were cooled to a room temperature. Then, 2.5 kg of sodium meta-aluminate (Na:Al=1.3:1) solution was impregnated onto the alumina particles, a concentration of the prepared sodium meta-aluminate was 15% wt, and a sample with a theoretical loading capacity of 15.8% wt was finally obtained. The sample was dried for 3 h at 120° C., was then activated for 3 h under the condition of 300° C., and was marked as D5. Through the butadiene side reaction test, the pressure drop was about 14.6%.

The physical parameter indexes of samples of each embodiment and comparative example were shown in Table 2 below.

TABLE 2

Sample physical parameter index

| Sample number | Stacking density | Crushing strength | Abrasion | Whether aging treatment is received or not |
|---|---|---|---|---|
| S1 | — | — | — | Yes |
| S2 | 0.75 g/mL | 33N/particle | 0.28 wt % | Yes |
| S3 | 0.74 g/mL | 51N/particle | 0.15 wt % | Yes |
| S4 | 0.78 g/mL | 53N/particle | 0.23 wt % | Yes |
| S5 | 0.71 g/mL | 40N/particle | 0.13 wt % | Yes |
| D1 | 0.71 g/mL | 118N/particle | 0.25 wt % | No |
| D2 | 0.58 g/mL | — | — | No |
| D3 | 0.74 g/mL | 9N/particle | 0.65 wt % | No |
| D4 | 0.74 g/mL | 23N/particle | 0.47 wt % | Low aging temperature |
| D5 | 0.63 g/ml | 68N/particle | 0.33 wt % | No |

The performance indexes of samples of each embodiment and comparative example were shown in Table 3 below.

According to Embodiments 1-4, a desulfurizer prepared by combining activated alumina (with chi-rho and eta phases in crystal phase structures) and meta-aluminate had good hydrogen sulfide adsorption capability. Additionally, there was no attenuation after several cycles. According to Embodiment 5, a dechlorinating agent containing gamma-phase activated alumina and prepared by combining pseudo-boehmite and meta-aluminate had the performance a little weaker than that of Embodiment 1 under the condition of the similar active component content. D1-D5 were used as comparative examples to compare the $H_2S$ adsorption performance and the physical performance, such as the stacking density and the crushing strength, of the pure gamma-phase alumina and the pure sodium meta-aluminate, and the influence of different aging conditions on the performance of the desulfurizer were compared at the same time. From the above embodiments and comparative examples, it could be seen that by using the activated alumina (with chi-rho and eta phases in crystal phase structures) and meta-aluminate and performing aging treatment under a certain condition, the sample showed the optimum hydrogen sulfide adsorption performance and regeneration performance, and at the same time, the side reactions were minimum.

FIGURE is an XRD diagram of an adsorbent sample prepared from gama-phase alumina as a carrier and the activated alumina as a carrier. From the FIGURE, it could be seen that the desulfurizer prepared from the activated alumina (with chi-rho and eta phases in crystal phase structures) according to the present invention showed a mixed phase at its characteristic peak. Additionally, a characteristic peak of the meta-aluminate was not found through XRD, and it showed that the meta-aluminate was in a highly scattered state on alumina.

Embodiment 7

The present embodiment was most identical to Embodiment 1, except for the adjustment on the mass of the

TABLE 3

Performance comparison of samples

| Serial number | $M_2O$ content *wt % | M:Al** mol % | Specific surface area $m^2/g$ | Pore volume $cm^3/g$ | Adsorption time min | Attenuation condition of adsorption time after 15 cycles | Preparation method |
|---|---|---|---|---|---|---|---|
| S1 | 10.82 | 2.05:1 | 116.5 | 0.301 | 104 | No attenuation | Impregnation |
| S2 | 8.93 | 1.34:1 | 133.2 | 0.280 | 106 | No attenuation | Rolling granulation |
| S3 | 2.55 | 1:1 | 175.8 | 0.362 | 84 | No attenuation | Rolling granulation |
| S4 | 9.33 | 1:1 | 144.7 | 0.387 | 106 | No attenuation | Rolling granulation |
| S5 | 10.67 | 1:1 | 127.7 | 0.375 | 92 | No attenuation | Strip extrusion |
| D1 | 0.65 | — | 307.5 | 0.392 | 46 | Attenuation was started after 6 times of experiments, and bed layer inactivation occurred in the eighth time of experiments. | — |
| D2 | 36.71 | 1:1 | 12.75 | 0.04 | 38 | No attenuation | — |
| D3 | 9.42 | 1:1 | 138.5 | 0.375 | 62 | No attenuation | Rolling granulation |
| D4 | 8.95 | 1:1 | 141.3 | 0.346 | 70 | No attenuation | Rolling granulation |
| D5 | 10.55 | 1.3:1 | 98.5 | 0.296 | 65 | No attenuation | Impregnation |

*XRF test results
**Theoretical feeding value activated alumina to enable a mass ratio of the activated alumina in the obtained adsorbent sample to be about 75%.

Embodiment 8

The present embodiment was most identical to Embodiment 1, except for the adjustment on the mass of the activated alumina to enable a mass ratio of the activated alumina in the obtained adsorbent sample to be about 95%.

Embodiment 9

The present embodiment was most identical to Embodiment 1, except for the adjustment on the mass of the activated alumina to enable a mass ratio of the activated alumina in the obtained adsorbent sample to be about 60%.

Embodiment 10

The present embodiment was most identical to Embodiment 1, except for the aging temperature being 800° C., the aging time being 24 h,
the drying temperature being 80° C., the drying time being 0.5 h,
the roasting temperature being 450° C., and the rotating time being 1 h.

Embodiment 11

The present embodiment was most identical to Embodiment 1, except for the aging temperature being 130° C., the aging time being 12 h,
the drying temperature being 120° C., the drying time being 0.5 h,
the roasting temperature being 350° C., and the rotating time being 5 h.

The embodiments described above are intended to facilitate understanding and use of the invention by those of ordinary skill in the art. Various modifications to these embodiments will be readily apparent to those skilled in the art, and the generic principles defined herein may be applied to other embodiments without creative work. Therefore, the present invention is not limited to the above embodiments, and improvements and modifications made by those skilled in the art according to the disclosure of the present disclosure without departing from the scope of the present invention shall all fall within the protection scope of the present invention.

What is claimed is:

1. A regenerable hydrogen sulfide adsorbent, consisting of two parts: an active component and a carrier, wherein the active component is meta-aluminate, and the carrier is activated alumina,
wherein the meta-aluminate is a metal salt compound of a "$AlO_2^-$" atomic group and a metal element M and/or hydrogen element, and the metal element M is selected from one or a combination of more of alkali metal and/or alkaline earth metal elements.

2. The regenerable hydrogen sulfide adsorbent according to claim 1, wherein a weight ratio of the meta-aluminate is 0.5 to 40%, and a weight ratio of the activated alumina is 60 to 99.5%.

3. The regenerable hydrogen sulfide adsorbent according to claim 1, wherein the activated alumina is chi-phase alumina, rho-phase alumina, eta-phase alumina, gama-phase alumina or a mixed phase thereof.

4. The regenerable hydrogen sulfide adsorbent according to claim 1, wherein the metal element M is one or a mixture of Na and K.

5. The regenerable hydrogen sulfide adsorbent according to claim 1, wherein in the meta-aluminate, a mole ratio of the metal element M to an aluminum element is 1-5.5:1.

* * * * *